United States Patent Office.

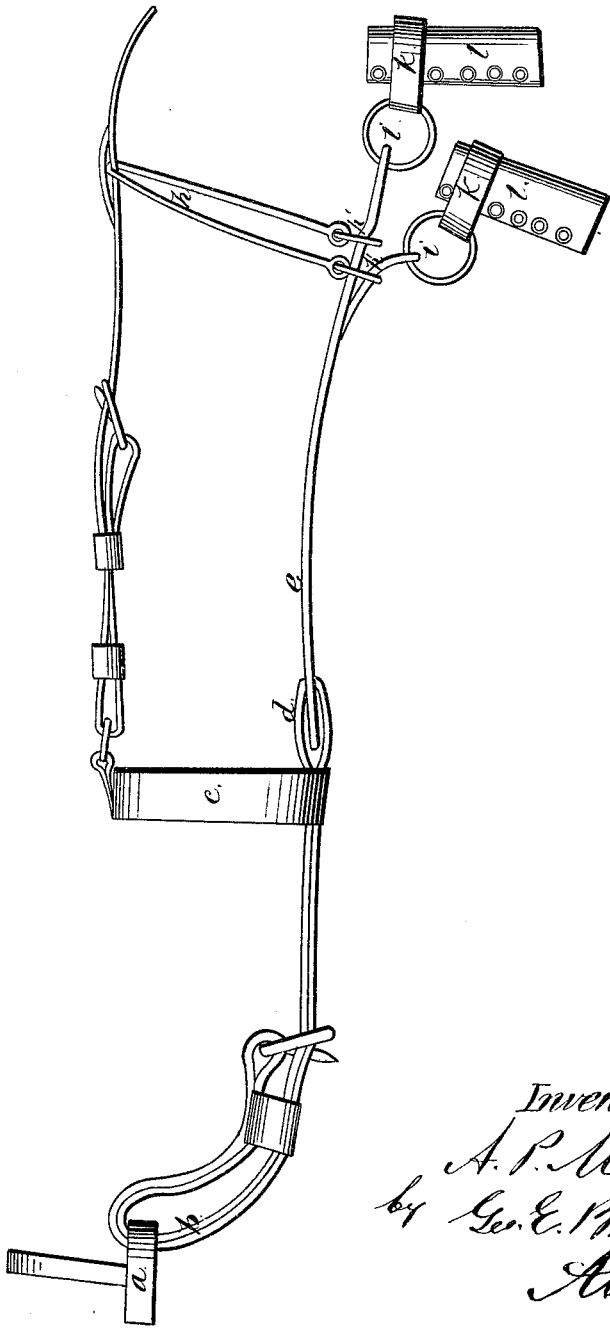

ARNOLD P. MASON, OF GOWANDA, NEW YORK, ASSIGNOR TO HIMSELF AND ZALMON HANFORD, OF SAME PLACE.

Letters Patent No. 91,462, dated June 15, 1869.

IMPROVED HORSE-FETTER.

The Schedule referred to in these Letters Patent and making part of the same.

*To all whom it may concern:*

Be it known that I, ARNOLD P. MASON, of Gowanda, in the State of New York, have invented a new and useful Improvement in Horse-Fetters; and I do hereby declare that the following is a full, clear, and exact description of the same, reference being had to the accompanying drawings, and letters of reference marked thereon, making a part of this specification, in which is a perspective view.

This invention consists in so connecting the head and hind feet of a horse, that the animal shall not be able to kick with the latter, or gallop, while, at the same time, all parts of his body may have proper freedom of motion.

To enable those skilled in the art to make and use my invention, I now proceed to describe its construction and operation.

Similar letters in the drawings refer to like parts.

In the drawings—

$a$ represents a band, made to encircle a horse's nose, to be held there by a proper arrangement of straps.

From the nose-band a strap, $b$, called a martingale, passes down between the horse's fore legs, and within the belly-girt $c$, and has a sheave, $d$, at its lower end, around which sheave passes a cord, $e$, the ends of which are led through rings $h'$, attached to the lower ends of an elastic band, $h$, which runs over the animal's rump through a loop in the back-strap.

The extremities of the cord $e$ are fastened in rings $i$, projecting from ferrules $k$ on the upper ends of boots $l$, which encase the animal's gambrel joints.

From the foregoing it is apparent that the horse is prevented, by each hind leg, from striking out with the other, and that, if he undertakes to kick with both hind legs at once, or to gallop, he brings at once a pressure upon his nose, that must immediately cause him to desist. At the same, the arrangement of the cord $e$ with the pulley $d$, gives the hind legs all needed freedom of motion when they move in unison at the trotting-gait, without interfering at all with the action of the head.

I am aware that this arrangement of cord and pulley is not new, and that there are several horse-fetters in use, made on somewhat similar principles; but none of these, so far as I know, connects the hind feet with the head of the horse, but always with the fore shoulders or body; nor do any such devices employ boots, such as I have described, as surrounding the gambrel joints, but merely narrow bands; and, so far as I am aware, it is new to use an elastic band to hold up the cord in the manner I have set forth.

What, therefore, I claim as new, and desire to secure by Letters Patent, is—

The combination of the nose-band $a$, martingale $b$, shear $d$, cord $e$, and boots $l$, as and for the purpose set forth.

ARNOLD P. MASON.

Witnesses:
C. S. KIMBLE,
A. B. GRISWOLD.